2,906,630

PROCESS FOR DEHYDRATING LIQUID FOODSTUFFS WITH PRESERVATION OF VOLATILE FLAVORS

Victor A. Turkot, Oreland, Roderick K. Eskew, Glenside, and Nicholas C. Aceto, Roslyn, Pa., assignors to the United States of America as represented by the Secretary of Agriculture No Drawing. Application November 26, 1957
Serial No. 699,145

6 Claims. (Cl. 99—206)

(Granted under Title 35, U.S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

Liquid foodstuffs in powdered form are valuable products because of their low weight and small bulk and especially because of their ability to withstand long storage at ordinary temperatures without the excessive flavor damage suffered by these products stored in liquid form.

In the case of some of these liquid foodstuffs the flavor and aroma are highly volatile and hence easily lost during concentration. Liquid foods are highly sensitive to heat damage during their concentration. Also, the powdered liquid foods may be hygroscopic. These properties have made it difficult heretofore to produce powdered liquid food products without the loss of flavor and without damage by heat.

The object of the present invention is to provide improved processes for making powdered liquid foodstuffs containing substantially all of the characteristic flavor that was in the starting liquid food, i.e., full-flavored. Such foodstuffs include for example, honey and such plant extracts as extracts of roasted coffee bean, tea leaves and vanilla bean. A further object of this invention is to prepare volatile aroma concentrates, i.e., essences entrained in solid materials, enabling their use in dry products, such as dessert mixes and the like. Essences are liquids and their use is largely limited to restoration to liquid products. In their liquid form they cannot be added to dehydrated foods without destroying the dry form of such products. The liquid aroma concentrates or essences must therefore be reduced to a dry state.

In the preferred method for making powdered full-flavor liquid foodstuffs, the products are concentrated to at least about 96% solids content, in a down flow, agitated film type vacuum evaporator and then while in the molten form and under superatmospheric pressure an appropriate amount of their essence is injected.

A sugar or mixture of sugars may be added to the liquid foodstuff to lower the temperature at which it is molten and flowable and hence to protect it against heat damage.

Essences may be recovered by passing to a fractionating column the vapors released during the atmospheric concentration of the liquid foodstuff (copending application Serial No. 571,112, filed March 12, 1956; Nicholas C. Aceto et al.).

An alternate method of recovering essence is to concentrate in a fractionating column the aroma bearing distillate obtained from the vacuum concentration of the liquid foodstuff. Even when thus concentrated several hundred fold, the essence usually is still mostly water; hence, for use in the present invention it should be of as high strength as practicable. While we can use essences of only about 200-fold strength we prefer that they be a 1000-fold or even higher in strength in order to cause the minimum moisture increase in the product. In the case of easily oxidized essences, notably coffee essence, it may be necessary to add antioxidants.

After the essence is injected into the molten powder the mixture is quickly cooled to avoid volatilization of the essence. The molten product is typically at a temperature of 225–250° F. while the boiling point of the essence is usually somewhat below 212° F., hence it is surprising that the two can be mixed without instant flashing of the essence. The amount of essence that would be volatilized if the essence were to contact the molten product at atmospheric pressure would be relatively large, especially when unusually volatile or unusually highly concentrated essences are being used. For this reason we conduct the mixing of essence and molten product at a superatmospheric pressure in the range of about 5 to 100 p.s.i. gauge. After the materials have been mixed under pressure the pressure may be reduced to that of the atmosphere without appreciable loss of essence, especially when the product is cooled promptly thereafter.

A practical and convenient method for mixing the essence with the molten product is to feed the essence at the proper rate into the discharge line of the pump that removes molten product from the down flow, film type vacuum evaporator in which it is dehydrated. To facilitate accurate metering of the essence by the essence feed pump, its viscosity may be increased by the addition of some sugar or other bodying agent. The mixture is then sent through one or more orifices or other mixing device such as a centrifugal pump to assure thorough blending. After being mixed the now full-flavored molten product is rapidly cooled by discharging it onto a cold surface, suitably a water cooled roll or rolls, from which the now cold, brittle solid is removed and ground to a coarse powder. When the product is hygroscopic it must be protected from moisture during cooling, grinding and packaging operations.

In the cooling of the molten product it is highly advantageous to cool it in thin films or sheets. Because of its highly frangible nature, the cooled product is readily ground or crushed to the desired size provided sufficient heat to soften it and cause tackiness is not developed during the operation. In the preferred embodiment of the invention the molten product is applied as a thin sheet or film to the cold surface of the rolls or other cooling device. These films are cooled almost instantly to a hard, brittle solid that is easily removed as thin flakes by a doctor blade. The flakes are highly fragile and easily ground or crushed to a coarse powder.

In the preferred method for preparing volatile aroma concentrates or essences in dry form for use as dry flavoring agents of high potency, a suitable concentrated sugar or mixture of sugars are dried, impregnated with essence and embrittled by a process similar to that described above. Where desired to use the dried essences in a colored dry product a suitable coloring agent e.g. caramel can be added to the sugar mixtures before dehydration. It is recognized that essential oils are now marketed in a "dry" state. These are usually made by spray drying emulsions of such oils in aqueous solutions of gums yielding minute globules of oils incapsulated in a gum shell. Although well-suited to some essential oils, some suffer oxidation and flavor change during the drying. Furthermore the process is not suited to conversion to a dry form of nonoleaginous flavor concentrates such as aqueous essences, or essential oils, volatile coffee oils and the like in solution in water miscible solvents. In making high fold essences as described above, some volatiles may reach a concentration such that they separate as an oil phase. This troublesome 2-phase system may be eliminated by the addition of a water miscible oil solvent suitable for use in foods, such as propylene glycol and ethyl alcohol.

In the preparation of full-flavor powdered liquid foodstuffs such as, dry honey and coffee extract essence is generally restored only in the same proportion that it was recovered from the original liquid foodstuff. In contrast, when preparing essences in dry form, very high fold essences are desirably added to the molten sugars in as large a proportion as possible consistent with obtaining a non-tacky dry product to provide a dry natural food flavor of high potency.

The practice of the invention is illustrated by the following examples.

*Example I*

*Full-flavored dried honey.*—The starting material was Bakers' Amber Grade honey of approximately 81% solids content. This material was pumped through a tubular preheater, which raised its temperature to 135° F., into a down-flow, agitated-film type vacuum evaporator operated at 28.8 inches of mercury vacuum in the vapor space.

At a feed rate of about 37 pounds per hour the steam in the jacket was held at 10 pounds per square inch gauge to obtain a molten product at 239° F. with about 0.9% moisture content. This product was continuously withdrawn from the evaporator by a pump. Into the discharge line of this product pump was inserted a smaller tube through which honey essence was returned to the molten product at a rate of 1.3 milliliter per minute by a metering pump. This essence had been prepared by concentrating in a distillation column to about 150-fold the condensate obtained in dehydrating a previous batch of honey by the process described herein. The recovery of essence from the condensate followed methods well-known to those skilled in the art. Farther downstream in the product line the molten honey and essence passed through a small centrifugal pump which thoroughly mixed them into a homogeneous product while under a pressure of 25 pounds per square inch gauge. This molten product was then discharged continuously into the nip of a pair of chilled rolls (about 40° F.) rotating toward each other and spaced to give a flake thickness of about 0.015 inch. In about 7 seconds the product formed a brittle solid which was scraped from the rolls by doctor knives. These flakes were fragile and were easily broken up to pass a 10-mesh screen with little production of fine powder. The chilling and comminuting were carried out under an atmosphere of less than 15% relative humidity to prevent moisture pick-up by the product.

This dried full-flavored honey, when reconstituted with water to its original solids content had suffered no change in color and possessed the fine floral aroma of the original liquid honey.

*Example II*

*Full-flavored soluble coffee powder.*—A commercial clarified coffee extract, prepared by the countercurrent leaching of fresh-roasted ground coffee beans with hot water following procedures well-known to those skilled in the art was the starting material. Its solids content was increased from the original 22% up to 64% by rapid continuous evaporation at atmospheric pressure (copending application Serial No. 571,112, filed March 12, 1956; Nicholas C. Aceto et al.). During the rapid evaporation the vapors evolved, bearing the coffee aroma, were continuously fractionated in a distillation column to produce a volatile flavor concentrate, or essence, of coffee, constituting by volume one thirty-third part of the original coffee extract. This essence was further concentrated in another efficient distillation column to a volume 1/330 that of the original 22% solids extract. Its concentration was now about 6300-fold, referred to freshly-brewed beverage coffee containing 1.25% soluble coffee solids.

The concentrated coffee extract containing about 64% solids was then mixed with invert sugar syrup of about 77% solids in such proportion that the mixture contained equal weights of invert sugar solids and coffee soluble solids, and had an overall solids content of about 70% by weight. This mixture was then fed through a tubular preheater, which raised its temperature to 163° F. into the down-flow agitated-film type vacuum evaporator of Example I operated at 21 inches of mercury vacuum in the vapor space. At a feed rate of about 43 pounds per hour the steam in the jacket was held at 20 pounds per square inch gauge to obtain a molten product at 246° F. and 2.8% moisture content. The 6300-fold coffee essence was returned to the dehydrated molten product at a rate of 1.6 milliliters per minute by the method of Example I. The essence was thoroughly blended in by passing the mixed product and essence streams through a small centrifugal pump. The product was then cooled on chilled metal rolls to form brittle flakes about 0.015 inch thick which could easily be broken to pass a 10-mesh screen. Cooling, and grinding were done under an atmosphere of less than 15% relative humidity to avoid moisture pick-up by the product. When 2.5 grams of this product were dissolved in 100 grams of hot water, an excellent beverage coffee resulted. Moreover, when 15 grams of this product were added with 41 grams of sucrose to 170 grams of foam dried whole milk (copending application, "Dried Fat-Containing Milk Products of Easy Dispersibility," Serial No. 638,177, filed February 4, 1957; H. I. Sinnamon et al.), and the mixture reconstituted with 1342 grams of water the resulting beverage was a coffee-flavored whole milk of excellent flavor.

*Example III*

*Solid essence.*—Essence of 150-fold was prepared from fresh apple juice by conventional procedures. This essence was then further concentrated in a small, efficient distillation column to about 1000-fold. Into 100 milliliters of this essence was dissolved 140 grams of sucrose, followed by the addition of 21 milliliters of absolute ethyl alcohol to dissolve the trace of oil present.

A sugar syrup was prepared by dissolving in water sucrose, anhydrous dextrose, and corn syrup solids of 43 dextrose equivalent to yield a solution of about 70% total solids content. The proportions of the sugars used by weight on the dry basis were sucrose 65%, dextrose 25%, and corn syrup solids 10%. This syrup was fed through a tubular preheater, which raised its temperature to about 185° F., into the down-flow, agitated-film type vacuum evaporator of Example I, operated at an absolute pressure of 5.3 inches of mercury in the vapor space. At a feed rate of about 43 pounds per hour the steam pressure in the jacket was held at 22 pounds per square inch gauge (262° F.) to obtain a molten product at 244° F. and 1.7% moisture content. This product was continuously withdrawn from the evaporator by a pump. Into the discharge line of this product pump was inserted a smaller tube through which the apple essence was added to the molten sugars at a rate of about 13 milliliters per minute by a metering pump. Farther downstream in the product line the fluids passed through a small centrifugal pump which intimately mixed the essence and molten sugars into a homogeneous stream. This molten product was then discharged continuously into the nip of a pair of chilled rolls (about 40° F.) rotating toward each other and spaced to give a flake thickness of about 0.015 inch. In about 7 seconds the product formed a brittle solid which was scraped from the rolls by doctor knives. These flakes were fragile and easily broken to pass a 10-mesh screen with little production of fine powder. The cooling, grinding and packaging of the product were carried out in an atmosphere of less than 15% relative humidity to avoid moisture pick-up by the product.

This dry product contains the essence uniformly distributed throughout the solid mass of sugars and tightly held.

We claim:

1. A process for preparing dehydrated foodstuffs containing volatile aromas comprising dehydrating a liquid foodstuff from the group consisting of honey, coffee extract, and tea extract until said liquid foodstuff is obtained in a molten state of at least 96% solids, impregnating said molten foodstuff under superatmospheric pressure with the concentrated volatile aroma of said foodstuff, thoroughly intermixing, and quickly chilling the mixture to a brittle solid.

2. Process of claim 1 wherein the liquid foodstuff is honey.

3. A process for preparing volatile aroma concentrates in dry form comprising dehydrating a sugar in a molten state to at least 96% solids, impregnating said molten sugar under superatmospheric pressure with a concentrated volatile aroma, thoroughly intermixing, and quickly chilling the mixture to a brittle solid.

4. A process for dehydrating a liquid foodstuff with preservation of its volatile flavor comprising stripping the volatile flavor from a liquid foodstuff from the group consisting of honey, coffee extract, and tea extract, dehydrating the stripped liquid foodstuff until it is obtained in a molten state of at least about 96% solids, separately concentrating the recovered volatile flavor to at least about 200-fold strength, mixing the molten dehydrated foodstuff and concentrated volatile flavor under superatmospheric pressure and quickly cooling the product thus obtained to a temperature at which it is a brittle solid.

5. Process of claim 4 in which the liquid foodstuff is coffee extract.

6. Process of claim 4 in which the liquid foodstuff is tea extract.

References Cited in the file of this patent

UNITED STATES PATENTS

| | | |
|---|---|---|
| 1,240,020 | Boberg | Sept. 11, 1917 |
| 1,367,715 | Pratt et al. | Feb. 8, 1921 |
| 1,367,716 | Pratt et al. | Feb. 8, 1921 |
| 1,367,725 | Trigg | Feb. 8, 1921 |
| 2,816,039 | Eskew | Dec. 10, 1957 |
| 2,816,840 | Turkot et al. | Dec. 17, 1957 |